:::::

US010433399B2

(12) United States Patent
Den Hartog et al.

(10) Patent No.: US 10,433,399 B2
(45) Date of Patent: Oct. 1, 2019

(54) CROWD MANAGEMENT SYSTEM

(71) Applicant: SIGNIFY HOLDING B.V., Eindhoven (NL)

(72) Inventors: Edith Danielle Den Hartog, Eindhoven (NL); Martijn Marius Hultermans, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 16/095,056

(22) PCT Filed: Apr. 19, 2017

(86) PCT No.: PCT/EP2017/059279
§ 371 (c)(1),
(2) Date: Oct. 19, 2018

(87) PCT Pub. No.: WO2017/182517
PCT Pub. Date: Oct. 26, 2017

(65) Prior Publication Data
US 2019/0104596 A1 Apr. 4, 2019

(30) Foreign Application Priority Data
Apr. 22, 2016 (EP) ..................................... 16166623

(51) Int. Cl.
*H05B 37/02* (2006.01)

(52) U.S. Cl.
CPC ..... *H05B 37/0227* (2013.01); *H05B 37/0236* (2013.01)

(58) Field of Classification Search
CPC ........................ H05B 37/0227; H05B 37/0236
(Continued)

(56) References Cited

U.S. PATENT DOCUMENTS

| 4,924,416 A | 5/1990 | Sasao |
| 2008/0198009 A1 | 8/2008 | Hoeben et al. |

(Continued)

FOREIGN PATENT DOCUMENTS

| WO | 2010026521 A1 | 3/2010 |
| WO | 2014147524 A1 | 9/2014 |
| WO | 2017108466 A1 | 6/2017 |

OTHER PUBLICATIONS

K. S. Anantha Krishna, "Effect of Architectural and Spatial Variables on the Perception of Crowding," Architectural Science Review, 34:3, 1991 (15 Pages).

*Primary Examiner* — Daniel D Chang
(74) *Attorney, Agent, or Firm* — Akarsh P. Belagodu

(57) ABSTRACT

A crowd management system for influencing a crowd of people to distribute itself between a first region and a second region, comprising: at least one presence sensor configured to sense occupancy information from the first region and the second region; and a controller configured to receive said occupancy information from the at least one presence sensor; and at least one environmental control element configured to control an environmental effect in both the first region and second region; wherein said controller is configured to compare the occupancy information relating to the first region and the second region and based thereon to control the environmental effect in both the first region and the second region via the at least one environmental control element, such that the environmental effect in one of the first region or the second region is relatively more attractive or repellent than the other, in order to thereby influence at least a portion of the crowd to distribute or redistribute itself between the first region and the second region.

15 Claims, 6 Drawing Sheets

(58) Field of Classification Search
USPC .......................................................... 315/307
See application file for complete search history.

(56) References Cited

U.S. PATENT DOCUMENTS

| | | | |
|---|---|---|---|
| 2010/0277333 A1* | 11/2010 | Van De Sluis | F21V 23/0442 340/686.1 |
| 2011/0273312 A1 | 11/2011 | Eggleton et al. | |
| 2015/0248629 A1* | 9/2015 | Carlson | G06F 3/0482 705/7.25 |
| 2018/0033024 A1* | 2/2018 | Latapie | G06Q 30/0201 |
| 2018/0157227 A1* | 6/2018 | Alqarni | G06Q 30/01 |

* cited by examiner

CROWD MANAGEMENT SYSTEM

CROSS-REFERENCE TO PRIOR APPLICATIONS

This application is the U.S. National Phase application under 35 U.S.C. § 371 of International Application No. PCT/EP2017/059279, filed on Apr. 19, 2017, which claims the benefit of European Patent Application No. 16166623.5, filed on Apr. 22, 2016. These applications are hereby incorporated by reference herein.

TECHNICAL FIELD

The present disclosure relates to a crowd management system. More specifically, the present disclosure relates to a crowd management system that influences a crowd of people to distribute itself amongst different regions by changing the crowd perception in said different regions.

BACKGROUND

Visitors attending large scale events at stadiums and concert halls are served by concession stands scattered all over these venues. The sales of food, beverages and merchandise at these concession stands presents a sizable source of income. However, the queuing time at these concession stands, as well as toilets and exits, varies significantly over the duration of the event. For example, the queues are often at their longest right before and after the event, as well as during the intermission.

During these peak moments, an excessive visitor traffic leads to overcrowding as they move simultaneously from the seating area to concession stands in the atrium along relatively narrow corridors and passages. In addition, crowds are often gathered around the concession stands after making their purchase, in order to finish their alcoholic beverages and/or food before heading into the seating area. Due to the crowd amassed in the foyer or atrium, it is difficult for visitors to seek and identify the queue with the shortest waiting time. For example, visitors tend to converge towards the concession stands they have grown accustomed to, or the first concession stand they come across, without noticing there may be another concession stand in the vicinity that offers a shorter waiting time. The uneven distribution of crowd may lead to loss of sales as the concession stands are not fully utilised during the relatively short time window. Furthermore, an uneven distribution of crowd also leads to employee stress, as well as longer waiting time and overall unpleasant experience for the visitors.

US2010/0277333A1 discloses a system for adjusting a dynamics level of a lighting atmosphere based on a determined presence level of people in a supervised area. This allows, for example, to reduce the dynamics of a lighting atmosphere when a supervised area in a store becomes crowded.

WO2010/026521 teaches an area indication system for guiding passengers to the correct check-in queues at airport. The area indication system is capable of detecting the size of different queues and subsequently distributing a crowd among the queues, by attracting the crowd towards a shorter queue with the use of visual indication elements.

SUMMARY OF INVENTION

Given the overcrowded-ness and chaotic atmosphere in a stadium or a concert hall during an intermission, the area indication system as disclosed in WO2010/026521 may prove ineffective in attracting a crowd to a shorter queue or a less crowded area. For example, assuming most of the visitors are occasional visitors and are unfamiliar with the venue, given the short window offered by the intermission, they may not be easily lured into moving into a different queue or to occupy an unfamiliar area using the prescribed visual indication element alone. Similar considerations may apply in other crowded management scenarios.

As a result a more effective crowd management system is required. Particularly, as recognized herein, there is a deficiency in WO2010/026521 in that it only attempts to beckon people towards the destination area, but has no control over the region they are leaving (the source region). Instead, it would be desirable to control the environment in both the destination region and also the source region. For example, in addition to attracting the crowd of people towards a desirable region, e.g. a region having a short queuing time or open spaces, the crowd management system may also employ mechanisms to discourage people from entering, or repelling people from, an undesirable region, e.g. a region having a long queuing time or crowded spaces.

According to a first aspect of the invention, there is provided a crowd management system for influencing a crowd of people to distribute itself between a first region and a second region, comprising:

at least one presence sensor configured to sense occupancy information from the first region and the second region; and a controller configured to receive said occupancy information from the at least one presence sensor; and at least one environmental control element configured to control an environmental effect in both the first region and the second region;

wherein said controller is configured to compare the occupancy information relating to the first region and the second region and based thereon to control the environmental effect in both the first region and the second region via the at least one environmental control element, such that the environmental effect in one of the first region or the second region is relatively more attractive or repellent than the other, in order to thereby influence at least a portion of the crowd to distribute or redistribute itself between the first region and the second region.

The control of the environmental effect in the two regions may comprise generating an attractive effect in the destination region and a repellent effect in the source region (i.e. changing the environment or ambience in the two regions), or generating a neural effect in the source region and an attractive effect in the destination region, or generating a repellent effect in the source region and a neutral effect in the destination region. Either way, even if one of the effects is neutral, the effect is still decidedly controlled in both regions at once so that the atmosphere in the neutral region is not left to chance. WO2010/026521 beckons people towards the desired area, but it has no control over the area the people are coming from. Therefore it still cannot control whether the destination region is in fact more enticing relative to the source region, and instead simply relies on an assumption (which might not always be true) that the source regions simply happens by serendipity to be neutral.

In embodiments, the first region and second region may each comprise a crowd of people, wherein the crowd of people may form queues of different sizes waiting to be served at concessions stalls or to use the toilets or queuing for the exits. The crowd of people can be those who already in the queue, or they can be people wishing to join the crowd in the first region and the second region. The crowd of people may be any plurality of people, likely to be more than three people, and in most cases the crowd of people comprises more than 10 people.

Optionally, the occupancy information sensed by the at least one presence sensor for each respective one of the first and second regions, and based upon which the controller performs said control, comprises any one or more of: an absolute number of people in the respective region, a measure of a number of people in the respective region relative to a capacity of the respective region, a number of people in one or more queues in the respective region, a rate of flow of people passing towards or away from the respective region, or crowd throughput, of the respective region, a rate of flow of people passing a predefined point or boundary in the respective region, a number of people turning in one or more predefined directions, a rate of flow of people in one or more predefined directions, and/or a number of people having a facial orientation or gazes in one or more predefined directions. All of these measurements are ways of not just detecting the number of people in each of the first and second regions, but also their current intention with respect to the first and second regions. Thus in such embodiments, the controller can advantageously adapt the lighting not just based on the current situation, but based on where the crowd is predicted to be heading.

Optionally, the first region having either a larger crowd size or lower capacity or lower rate of flow (crowd throughput) than the second region. In most cases it is desirable to distribute the crowd from the first region to the second region, i.e. first region is the source region, wherein the second region is the destination region. Alternatively in some cases, for example in the case of an emergency, it is desirable to distribute a crowd from an area with a low population density to a more populated area in order to group and control the otherwise dispersed crowd, thus in this case the first region is the destination region and second region is the source region. Therefore a person skilled in the art would understand that the crowd control system is capable of either distributing crowd evenly or unevenly amongst the first region and the second region.

Optionally, the at least one presence sensor is adapted to detect any one or more of rate of flow and direction of people moving towards or away from the first region or second region; and wherein the controller is configured to perform said control of the environmental effect in the first region and second region based on any one or more of rate of flow and direction towards or away from the first or second region, in addition to the occupancy information of the first region and second region. Such traffic flow data allows the environment control elements to control environmental effect in the first region and second region prior to the arrival of an incoming crowd, as such permitting a more efficient crowd distribution.

Optionally, the occupancy information comprises real time measurements from the at least one presence sensors; and wherein, via the at least one environmental control element, the controller is configured to control the environmental effect in the first region and second region based on said real time measurements. The real time measurements accounts for any delay arising from communication and image analysis.

Optionally, the controller is configured to determine a target change in the occupancy information, to determine a degree of said control of the environmental effect in the first and second regions based on the target change, to use the least one presence sensor to monitor a resulting change in the occupancy information in response to said control, and if the resulting change does not meet the target change after a predetermined time, to adapt the control of the environmental effect in one or both of the first and second regions in order to bring the resulting change closer to the target change. That said, the (implemented) degree of said control of environmental effect is used as input at the controller, as such a more responsive control can be achieved.

Optionally, the occupancy information comprises historical data captured by the at least one presence sensor; and wherein the environmental control elements pre-emptively controls the environmental effect at the first region and second region based on said historical data. Pre-emptive (or preventive) environmental control, is especially effective when before a built-up of crowd in the first region or second region at the beginning of peak moments, i.e. at the start of intermission, as such an incoming crowd can be distributed more effectively to prevent uneven distribution among the first region and the second region.

Optionally, under the influence of controlled environmental effect, at least part of the crowd is both subconsciously repelled from one of the first region or the second region and attracted to the other of the first region or the second region. The simultaneous repulsion in one region and attraction in the other significantly improves the effectiveness of the system.

Optionally, the at least one presence sensor comprises: one or more of optical cameras, one or more load cells, one or more microphones, one or more thermal sensors, one or more ultrasound sensors, and/or one or more infrared sensors, or any other presence sensor known to the person skilled in the art.

Optionally, the at least one environmental control element comprises lighting system for emitting illumination into the first and second regions; and wherein said lighting system is configured to enable the controller to perform said control of the environmental effect in the first region and the second region by varying a light characteristic of the emitted illumination, the varied light characteristic comprising any one of a position, orientation, intensity, colour temperature and/or illumination pattern of the illumination; and wherein said control of the environmental effect in the first and/or second region comprises:
a) emitting illumination with an unpleasant light characteristic to repel the at least part of the crowd from the first region or the second region, and/or
b) emitting illumination with a pleasant light characteristic to attract at least part the crowd to the first region or the second region.

Optionally, said lighting system is configured to enable the controller to perform said control of the environmental effect in the first region and the second region by highlighting one or more key elements within the first region and second region; and wherein said key elements comprise one or more walls, floor regions and/or signs. More specifically, highlighting an open area in a region emphasizes openness and so attracts a crowd to said region, whereas highlighting a crowded area has an opposite effect; it repels the crowd from joining in said crowded area.

Optionally, the at least one environmental control element comprises a sound system for outputting either unpleasant sound effects or pleasant sound effects; and wherein the sound system is adapted to enable the controller to perform said control of the environmental effect in the first and/or second region by:
a) emitting unpleasant sound effects to repel at least part of the crowd from the first region or second region, and/or b) emitting pleasant sound effects to attract at least part of the crowd to the first region or second region. Optionally, the at least one environmental control element comprises elements that is capable of varying one or more of the temperature, air flow, humidity and smell, for repelling and/or attracting a crowd form and to the first region and second region.

Optionally, the controller is configured to perform said control by initiating the change in the environmental effect in the first region and second region when a difference between their respective occupancy information increases above a threshold. For example, the change in environmental effect, resulting from environmental control, may only take place if the queue distribution rises above a ratio of 65:35 between the first region and the second region.

Optionally, the controller is configured to adjust a degree of difference between the environmental effect in the first region and second region in relation to a difference in their respective occupancy information. For example the bigger the difference in crowd size between the first region and the second region, the more prominent in the change in environment to correct the uneven distribution.

Optionally, the controller (30) is configured to balance the a degree of the environmental effect between the first region and the second region such that increase in the environmental effect on one of the first and second regions is balanced by a corresponding decrease in the environmental effect in the other of the first and second regions. For example, the magnitude of repulsion in the first region may be lowered by increasing the attractiveness in the second region. This mechanism is particularly useful to prevent the subconscious influence from becoming noticeable, i.e. making an area extremely unpleasant.

The present invention further provides a method of influencing a crowd of people to distribute themselves between a first region and a second region, comprising the step of:

sensing occupancy information from the first region and the second region; and comparing said occupancy information relating to the first region and the second region; and based thereon controlling the environmental effect in both the first region and the second region via the at least one environmental control element, such that the environmental effect in one of the first region or the second region is relatively more attractive or repulsive than the other, in order to thereby influence at least a portion of the crowd to distribute or redistribute themselves between the first region and the second region.

BRIEF DESCRIPTION OF THE DRAWINGS

The present invention will now be described, by way of example only, with reference to the accompanying drawings, in which.

DETAILED DESCRIPTION OF EMBODIMENTS

Figure 1:
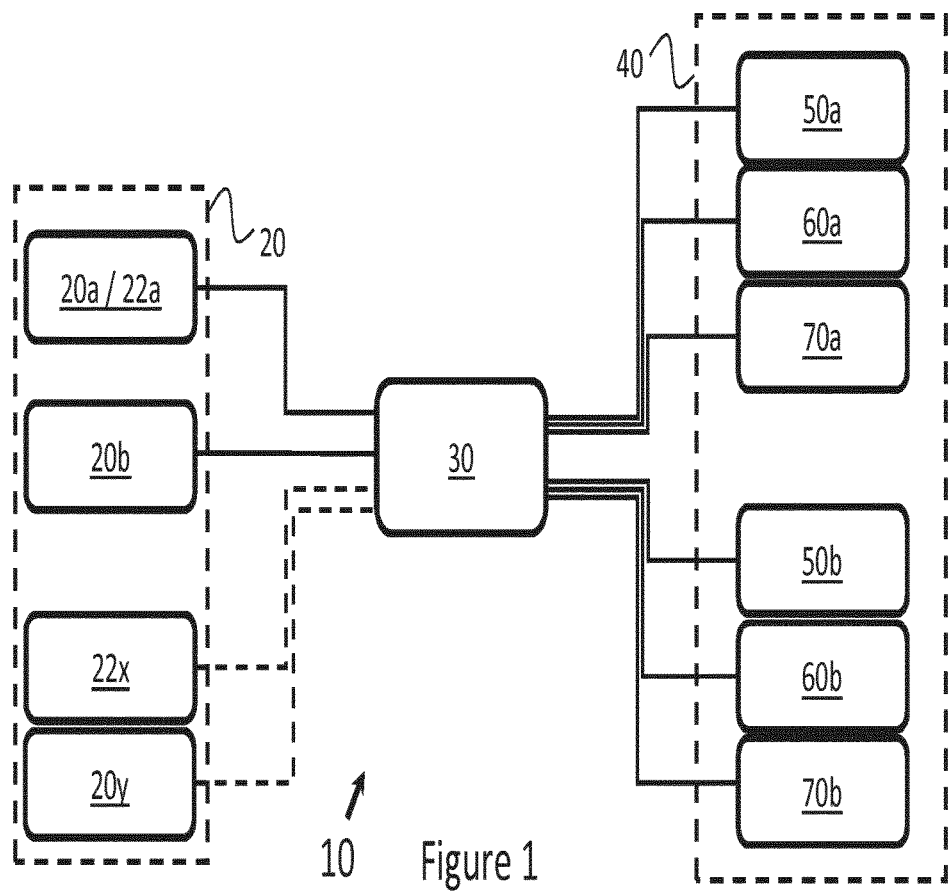
FIG. 1 is a schematic block diagram of an embodiment of a crowd control system according to the present invention.

FIG. 1 illustrates an example of a crowd management system 10 according to the present invention. The crowd management system 10 comprises a controller 30 in communication with presence sensors 20 and environmental control elements 40. Said communication may be established by wired connections such as Ethernet, DMX, optical fibre and/or powerline connections, or the communication may be made using wireless communication technology including infrared or RF based technology such as Bluetooth, Wi-Fi or ZigBee. The wireless communication technology herein refers to a wireless communication protocol plus the necessary capability to transmit and/or receive on a suitable medium over a suitable frequency range and for the technology in question (e.g. a certain RF band or bands). Any of the communication may be established using one or more of the above-mentioned communications technologies and/or others.

The presence sensors 20 are deployed for capturing occupancy information of a crowd of people in a plurality of target regions, e.g. regions in front of concession stalls and crowded areas in a foyer. For example, the presence sensors are capable of detecting the presence of a single person or a crowd of people, as well as measuring the size of a crowd or the capacity in each of the target regions. In addition, the presence sensors are capable of sensing crowd throughput towards or away from a region, for example it can be deployed to determine the waiting time for a given queue, or it can be used to provide traffic information of an incoming crowd heading towards the concession stalls or atrium, i.e. the rate of flow and direction of a crowd movement can be measured. The occupancy information and crowd traffic information may be analysed locally at the sensors 20 or otherwise the raw sensor output (e.g. raw images) may be communicated to and processed by the controller 30, using any signal or image processing techniques known to the person skilled in the art.

The controller 30 may be a central server, desktop computer, laptop computer, tablet, dedicated building control unit, or any other suitable control units. It may or may not be physically present in the vicinity of the target regions; for example it may be accessed locally or it can be controlled remotely at a control centre through a network. Furthermore, the controller 30 may take the form of a central unit or a distributed control function implemented over multiple units (e.g. embedded in the sensors(s) 20 and/or one or more environmental control elements 40). The controller 30 may be implemented in software code stored on a memory (comprising one or more storage devices) and arranged so as when run on a processor (comprising one or more processing units) to perform operations in accordance with the techniques disclosed herein. Alternatively the controller 30 may be implemented in dedicated hardware circuitry, or configurable or reconfigurable circuitry such as a PGA or FPGA, or any combination of software and hardware.

The controller 30, upon receiving the occupancy information for each of the target areas, is configured to compare the received occupancy information and evaluate whether distribution (or redistribution) of crowd among the many target areas is required. If distribution is called for, the controller 30 will then instructs the environmental control elements 40 to instigate a change in the environmental effect perceivable by the crowd amassed in the target areas. The change in environment may be perceived to be pleasant to attract the crowd of people towards the target area, or otherwise the change in environment can be perceived to be unpleasant for repelling the crowd. In either case the crowd is influenced or manipulated to distribute among the target areas subconsciously. In the present invention, the control of environmental effect comprising variation in one of more of the lighting characteristics, sound effect, smell, temperature, airflow and humidity in the target areas.

The controller 30 may carry out the crowd management technique automatically based on pre-set algorithms or instructions, or the controller 30 may be controlled manually via a user terminal (not shown) by a user. For example the user terminal may take the form of a mobile user terminal such as a smartphone, tablet or laptop, or a dedicated remote control unit controller; or alternatively the user terminal could be a non-mobile terminal such as a wall-panel or desktop computer provided locally or remotely through a network. The user terminal comprises a user interface (not shown) operatively coupled to the controller 30. The user interface comprises a screen and means for receiving a user input to initiate or dynamically adjust and control the environment effect in the target areas, as well as inputting new algorithms to be used in automatic crowd management. For example, the user interface may comprise a touch screen, point-and-click user interface or buttons for receiving user input.

Figure 2:
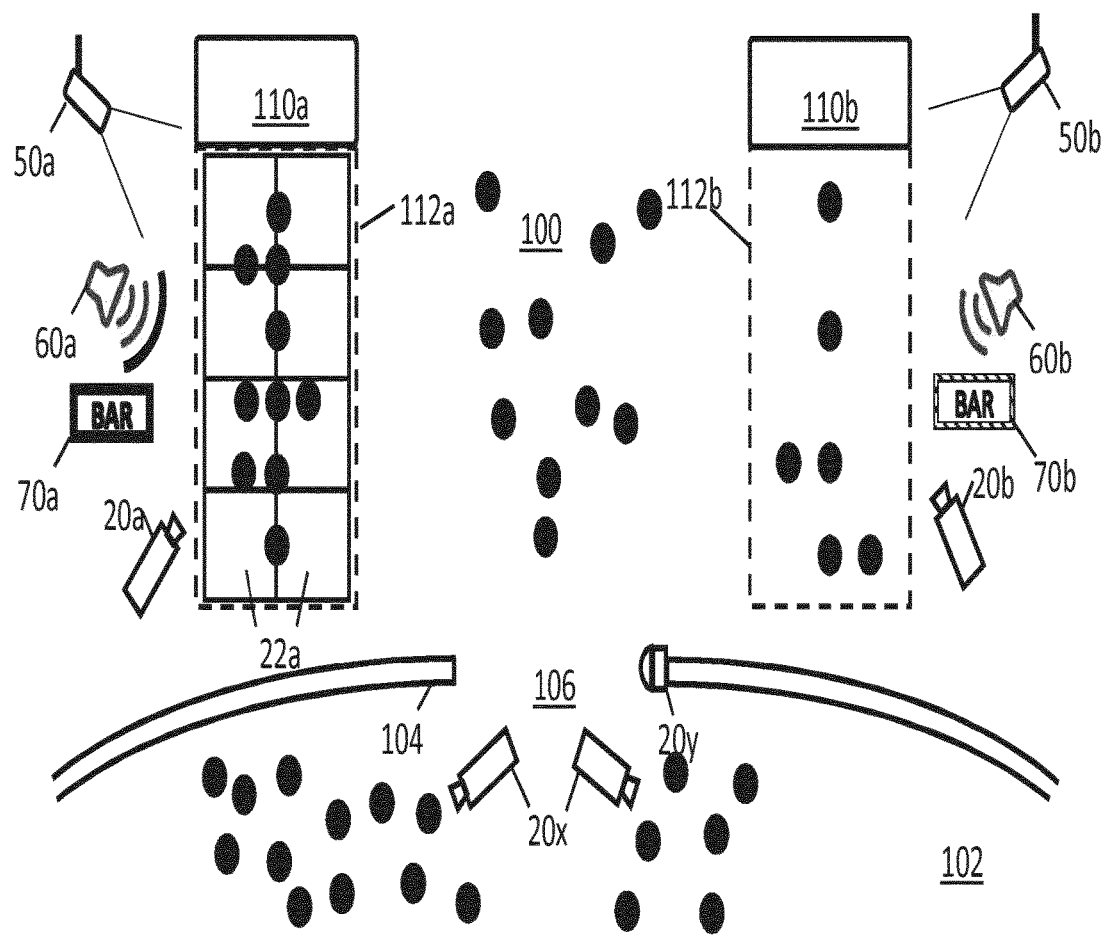
FIG. 2 is a plan view of a venue employing the crowd control system as shown in FIG. 1.

FIG. 2 gives an example of deploying the crowd management system 10 in a given venue, e.g. a stadium. For illustrating purpose, there are two concession stalls 110a, 110b disposed in the atrium area 100, each having a crowd of people each represented by dots, queuing in their respective region 112a, 112b. The person skilled in the art will readily understand that the above example is also applicable to restrooms and venue exits where queues are also present during peak moments; furthermore, the crowd management system 10 is capable to cater for more than two regions, i.e. the crowd management system is applicable to influence a crowd of people to distribute among any number of plurality of queues. Although the example given here directs to distributing crowd among different queues, the person skilled the art would also understand that the crowd management system 10 is also applicable to crowd distribution among different areas regardless the presence of a crowd. For example, the crowd management system 10 also capable of influencing people to distribute among two open areas subconsciously. In some embodiments, the crowd manage system 10 may also be deployed to manage traffic, e.g. influencing the drivers to distribute vehicles among different areas of a car park, or to leave through different exits.

The first region 112a, as shown on the left hand side of FIG. 2, have relatively more people waiting to be served at the first concession stall 110a than the second region 112b. Therefore it can be understood that the first region 112a has a larger crowd (or queue) size than the second region 112b.

In another scenario, the concessions stall 110a may serve its queuing customers more rapidly than concessions stall 110b, e.g. concessions stall 110a may have employed more cashiers than concessions stall 110b. In this case even the first region 110a having a larger crowd size than the second region 110b, the waiting time may actually be shorter in first region 110a because it processes transactions at a faster rate.

During the peak moments, the atrium 110 are expected to be packed with randomly scattered people, restricting the visibility for a crowd heading from a seating area 102 towards the concession stalls 110a, 110b in the atrium 100, as well as those already queuing in the regions 112a,112b. As a result, the crowd may find it difficult to identify the queue with the shortest waiting time, and so it is unlikely that they are able to distribute evenly among the queues of their own accord.

The crowd management system helps achieving the objective of distributing the crowd evenly among region 110a and 110b. As shown in FIG. 2, there are different types of presence sensors 20 distributed all over the venue 100, 102. For example, optical cameras 20a, 20b are installed inside or in the vicinity of the regions for monitoring the occupancy information in each of the region 112a and 112b. The optical cameras may be digital still or video cameras with storage capacity for storing captured images or videos, or they can be any optical cameras known to the person in the art. The optical cameras 20a, 20b can be Smart Camera comprising processors where suitable image analysis technique and algorithms may be carried out locally for detecting the size of a queue, or they can be used to calculate other parameters such as crowd throughput or rate of flow of people, group size and capacity in each of the region 112a and 112b; in this case the controller 30 is at least partially integrated in the Smart Camera. As a result of the front-end processing, the controller 30 receives a much simplified signal, i.e. since there is no need to transfer high quality video feeds, the bandwidth requirement in the communication between the cameras 20a, 20b and controller 30 is much reduced. The use of these Smart Camera are most suitable for crowd management system relying on wireless communication technologies.

Alternatively, the optical cameras 20a, 20b may feed the captured images and videos to the controller 30 to be processed therein; in this case the controller 30 is not integrated into the optical cameras 20a, 20b.

The skilled person would readily understand that although for illustration purpose two cameras 20a, 20b are shown in FIG. 2, the same effect may be achieved using only one camera (or presence sensor), as long as the single camera or sensor covers both the first and second region 112a,112b, i.e. by monitoring the multiple regions 112a and 112b simultaneously through a broad field of vision, or by monitoring said regions in an alternating manner.

The optical cameras 20a, 20b may be complimented with, or be replaced by, different types of presence sensors. For example, the size of queue and other occupancy information of the regions may be based on outputs from thermal sensors or microphones (not shown), i.e. the heat signal and noise level generated by the crowd can are be used to estimate the crowd size. The use of thermal sensors and microphones may serve as economical alternatives to Smart Cameras.

Optionally, the presence sensors may alternatively or additionally comprises device connectivity signal sensors for detecting the number of mobile devices (e.g. mobile phones and/or tablet computers) in the first and second regions 112a, 112b, i.e. the number of mobile devices detected can be used to estimate the crowd size. The device connectivity signal sensors may be one or more of WiFi signal sniffers, Bluetooth signal sniffers, GSM signal sniffers, 4G/LTE signal sniffers or any signal sensors known to the person skilled in the art.

Alternatively, physical presence sensors such as tactile switches, weight detectors or load cells may be provided on their own or to complement the optical cameras 20a, 20b. For example in FIG. 2, pressure sensing tiles 22a may be installed onto the floor in the regions to provide occupancy information; it is capable of monitoring the number of people occupying an individual tile, as well as detecting how the mass is transferred from one tile to another so to obtain crowd throughput data. The use of physical presence sensors may be considered to be a low cost and robust alternative to presence cameras 20a, 20b. In addition to those installed in the vicinity of the regions 112a, 112b, presence sensors are also installed at strategic locations around the venue to monitor the traffic heading towards the region 112a, 112b. For example, in order to anticipate a sudden surge of crowd during intermission, e.g. visitors exiting a tunnel 106 from the arena side of a stadium 102 to the "ring" 100 around it where concession stands are, presence sensors such as optical cameras 20x are deposited along the passages or routes leading to the atrium so that with the use of suitable image analysis algorithms the throughput (i.e. rate of flow), and the direction of the traffic are monitored and measured. In some embodiments, a suitable image analysis algorithm may be used to analysis the output of optical cameras, in order to detect the facial orientation and/or gazes (i.e. gaze tracking) of the people in the crowd in order detect their current intention with respect to the first and second regions 112a, 112b. For example visitor flows may be monitored by the proportion of traffic heading towards each of the region 112a and 112b, i.e. the amount of people turning left or turning right as they emerge from exit 106, and/or the amount of people facing or looking at each of the region 112a and 112b, such that the controller 30 and environmental control elements 40 may carry out dynamic environmental control in each of the region 112a and 112b prior to their arrival. This can be taken as a prediction of where people are likely to be moving, and adapt the environmental effects in the different regions to show an unwanted predicted flow of people, or increase a flow that is currently not predicted to be great enough towards the desired region. In addition, presence sensors in the form of triggers, for example as IR sensors 20y, may be deployed along the route of traffic, to activate the crowd management system 10 upon sensing the presence of a crowd, i.e. see IR sensor 20y deployed across a tunnel 106; the sensitivity of IR sensors 20y may be made adjustable so that the crowd management system 10 can be triggered either by the presence of a single person, or it can be triggered by a crowd if the detected crowd size is above a given threshold.

The image analysis technique may be any suitable analysis method known to the person skilled in the art. As an illustrated example, the Smart Camera 20a,20b, or the controller 30 in the case where the optical cameras are not capable of carrying out image analysis, may recognise the outline of people in the target region in a captured image or video frame and convert into numerical data such as the size of a crowd. The target region may be pre-defined, i.e. a region designated for queuing, or the image analysis technique may instead dynamically defines the boarders of a target region based on the presence of individuals. The image analysis technique is also configured to track the movement of individuals or a crowd of people so to determine crowd direction and rate of flow towards or away from the target area, as well as estimating waiting time at a queue.

There present invention further provides different types of environmental control elements that change crowd perception within the regions 112a and 112b, and thus influencing the crowd to distribute subconsciously among different queues. The environmental control elements can be applied in combination or each on their own.

For example, the ambience in the region may be made more pleasant or repelling by changing the one or more lighting characteristics of the illumination emitted by the luminaires 50a, 50b, including the output intensity, flickering frequency, colour temperature and colour rendering index. For example, cold colour temperature may be perceived as unpleasant, whilst deliberately bad colour rendering index may have a confusing effect on the crowd. The perception of crowdedness can be further emphasised by directing the projected illumination towards a crowded area (i.e. highlighting the people in said crowded area) to increases the perception of crowdedness and stuffiness, or dimming the illumination in visually open areas (if presented), so to repel the crowd from the crowded area. On the other hand the luminaires 50a, 50b may instead highlighting visually open areas, i.e. increasing intensity of illumination emitted towards interior elements such as walls, ceilings, pillars and empty floor spaces where no one is standing, to give a perception of emptiness and so attracts a crowd to converge towards said visually open areas. In addition, the visual perception of an area may be made more attractive by illuminating or highlighting of signs in the area, for example the highlighting of sign 70b in comparison to sign 70a in FIG. 2 for prompting a crowd in joining the queue in region 112b.

Figure 3:
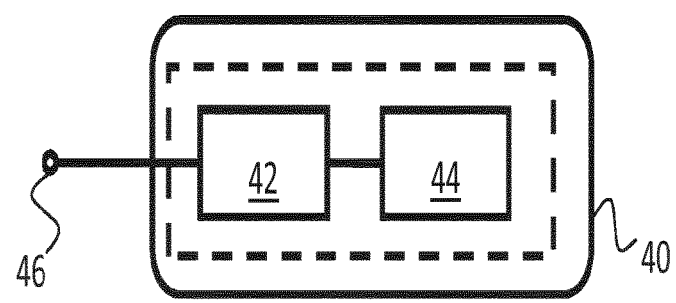
FIG. 3 is a schematic block diagram of a lighting system according to an embodiment of the present invention.

FIG. 3 shows an example of luminaire 50, which may take any suitable form such as a ceiling or wall mounted luminaire, a free standing luminaire, a wall washer, or a less conventional form such as a luminaire built into a surface or an item of furniture, or any other type of illumination device for emitting illumination into the region so as to induce a change in the environmental effect. The luminaire 50 comprising housing or support (not shown), light emitter 54 and a light control unit 52 in communication with the controller 30 via connection 56. The light control unit 52 serves to control the power supply and lighting characteristic of the light emitter 54, which may be any emitters suitable for illumination, for example LEDs, incandescent bulbs, halogen lamps, florescence lamps, arc lamps and discharge lamps. A light control unit 52 serving a target region may control the one or more light emitters 54 of said region, wherein the individual light signatures from each the light emitters 54 for said region may be different or synchronised.

The crowd perception of a region 112a, 112b may also be manipulated through the use of sound systems 60a,60b, for example speakers. In one embodiment, the volume of an audio output, i.e. noise, to region 101a may be increased to emphasis crowdedness and deliberately making the region 112a unpleasant, so to repel a crowd from joining said region 101a; in contrast the volume of audio output or noise in region 101b may be reduced or turned off, making it more attractive in comparison to region 101a. Alternatively, region 101b may be playing a pleasant tune, i.e. an audio recording of the concert, to attract people subconsciously to said region.

Figure 4:
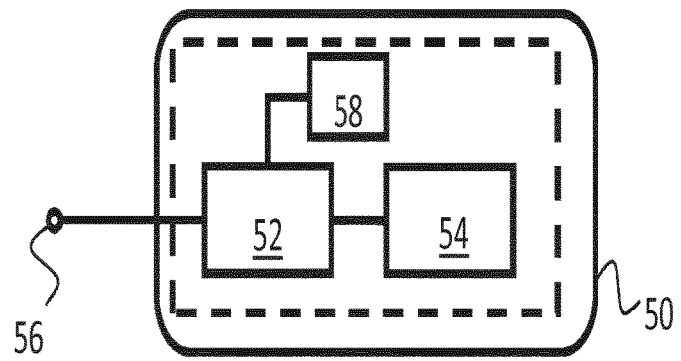
FIG. 4 is a schematic block diagram of a sound system according to an embodiment of the present invention.

FIG. 4 shows an example of sound system 60, which may take any suitable form such as a ceiling or wall mounted speaker, a free standing speaker, a wall washer, or a less conventional form such as a speaker built into a surface or an item of furniture, or any other type of sound system for projecting an acoustic effect into the region so as to change its acoustic ambience. The sound system 60 comprising a sound control unit 62 that communicates with the controller 30 via connection 66. Said sound control unit 62 serves to control the power supply, as well as acoustic effects and volume of a speaker 64, which may be any speaker known to the person skilled in the art, for example moving-iron speakers, piezo speakers or magnetostatic speakers. Furthermore, the sound control unit 62 is optionally connected to a media player 68 for supplying the sound control unit 62 with an audio signal; said media player may be any media player known to the skilled person in the art, for example optical disc player, cassette player, digital media player, radio and internet media player. A sound control unit 62 serving a region may control the one or more speakers 64 for said region, wherein the individual acoustic effect (e.g. noise, music) and volume output from each of the speakers 64 of said region may be different or synchronised.

Environmental control elements 40 may also include climate control or HVAC (not shown), for example the temperature, humidity and air flow may be deviated from an optimal comfort setting, i.e. making region 112a hotter and stuffier so to increase the perception of crowdedness, in order to repel people from said region.

Alternatively olfactory technologies (not shown) including air fresheners and digital scent technology may be deploy to change the perceived pleasantness in region 112a and 112b. As an example, air fresheners or fragrances may be deployed at region 112b to improve the appeal in said region for attract a crowd. Similarly, foul or unpleasant smell may be winded into region 112a to disperse the crowd.

The central control unit 30 carries out three main functions. First it is tasked to convert and analyse signals from the many upstream presence sensors 20. In some embodiments, image analysis are carried out locally by Smart Cameras, as such only the generated contextual occupancy information is sent to the controller. In some other embodiments, the raw images and video feed captured by multiple optical cameras may be directed to the controller 30 to be processed centrally to obtain said occupancy information. Likewise, other types of occupancy information, i.e. sound recordings from microphones or signals from thermal and IR sensors, may be processed locally at the presence sensors 20 or at the controller 30 using suitable algorithms.

Secondly, having received the different types of occupancy information from the many presence sensors 20 installed in the venue, the controller 30 may then combine and evaluate said occupancy information for providing a set of instructions to the environmental control elements 60. The occupancy information may be based on real time measurement, i.e. live feed from the presence sensors, and/or historical data previously generated from said presence sensors. The latter may be used in preventive crowd management, for example implementing crowd management before peak moments of traffic, i.e. the controller 30 may anticipate crowd movements and distribution based on past events, and implement environment control via environmental control elements 40 prior to queue formation.

There are many viable routes for implementing the present invention, depending upon circumstances and the types and locations of installed presence sensor. Some of the non-limiting examples are given in FIG. 5 to FIG. 7 and will be elaborated in greater details. Based on the detected occupancy information, the evaluation process determines a) whether there is a need to distribute crowd among regions, b) the type of environmental controlling element best suited for influencing crowd perception, i.e. a given crowd that may be susceptible to the influence of a particular type of environmental controlling element and c) the magnitude of influence required.

Thirdly and finally, the controller 30 sends out instruction to the environmental control elements 40 for implement environmental control in one of more of the region 112a, 112b, according to the output of the evaluation process.

Figure 5:
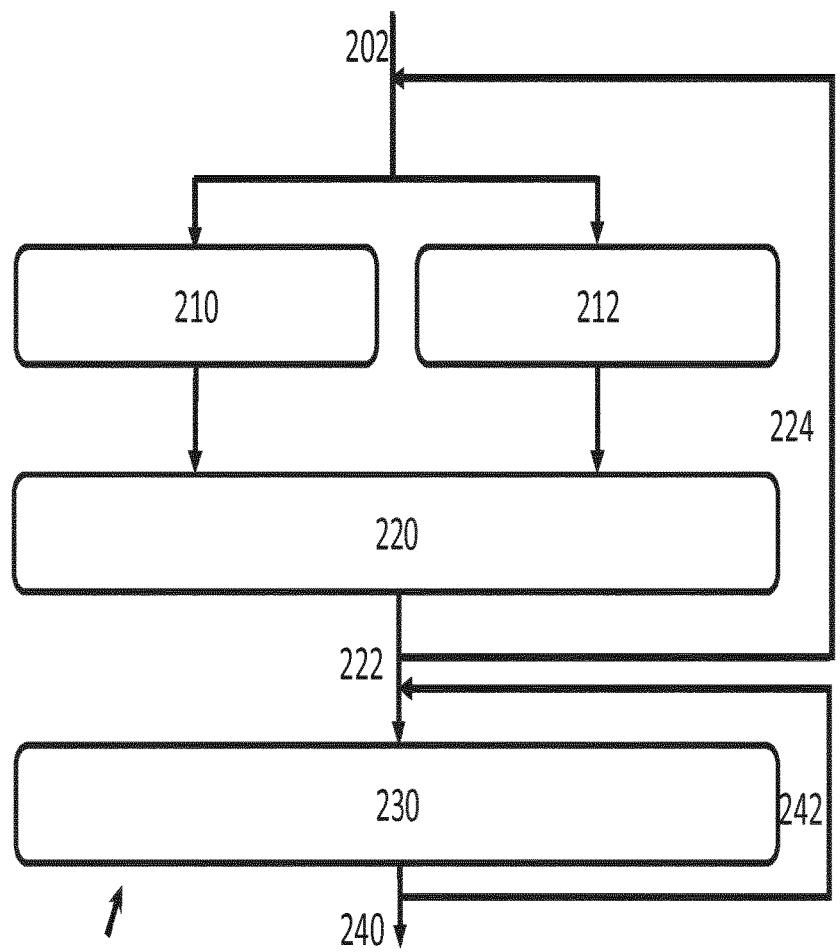
FIG. 5 is a flow chart showing the operation of controller according to an embodiment of the present invention.

FIG. 5 gives an example of evaluation process 200 for (re)distributing queues among two regions 112a,112b with the use of optical cameras 20a, 20b. The evaluation process starts at point 200, which may be started manually, or it can be triggered by the expiration of a timer, or a presence signal originated from presence sensor 20x/infrared sensor 20y indicating an incoming crowd. The evaluation process may be infinitely looped and repeated. In any case, the controller 30 instructs the presence sensors 20 to detect occupancy information, for example using a camera to detect the size of the crowd 210 and/or crowd throughput 212 in each of the region 112a and 112b. The received occupancy information in each of the regions are compared 220 and if the difference surges above a given triggering threshold 222, the evaluation process moves onto step 230; otherwise if the difference does not exceed said triggering threshold 224 the process starts again 200. For example, the occupancy information may indicate a significant difference in crowd size or throughput between the regions 112a and 112b, i.e. region 112a having a substantially larger crowd and longer waiting time than that in region 112b. The evaluation process may, optionally, consider the most appropriate type of environment control element 40 for a given crowd, i.e. if for example, a crowd of youth is in majority attendance of a rock concert, the central control system 10 may apply environmental control using lighting and climate control as they are less susceptible to noise.

The controller 30 then evaluates the degree of change required in the chosen type of environment 230, based on the difference in occupancy information between regions 112a and 112b. For example, step-wise degree change may be implemented; once said difference in occupancy information rises above the triggering threshold, say a crowd distribution of 65:35 between the first region 112a and second region 112b, the controller 30 may then proceed to instruct the environmental control element to implement a first level of crowd management, or in other word steering action, i.e. to make the first region 112a more repulsive/repelling and second region 112b more attractive. If said difference exceed a second threshold, say a crowd distribution of 85:15 between the first region 112a and second region 112b, the controller 30 will then instruct the environmental control element to implement a second level of steering action, where the repulsion in the first region 112a and attraction in the second region 112b are more prominent then the first level of steering action. Of course a person skilled in the art will understand that there can be an infinite number of levels of steering action, each having a more prominent influence on the crowd than the previous level. Alternatively to the abovementioned stepwise variation, the degree of environmental change may also vary linearly, or exponentially, with the difference in occupancy information. Furthermore, the degree of the change in environmental effect may vary depend upon the perception level of the crowd, i.e. a crowd comprising a majority of elderly people, due to poorer hearing and eyesight, may need a higher level of simulation in order to influencing them and so more prominent steering actions are needed.

In some embodiments, the degree of environment change in one region may be compensated by the degree of opposite change in another region, i.e. the controller may aim to balance the change in environmental effect between regions 112a and 112b, so to avoid significant environment change in either one of the regions. For example, when the environment effect has changed to an unbearable level in the first region 112a where it is not viable to further increase the unpleasantness said first region 112a, the control system may opt to increase the attractiveness in the second region 112b in order to achieve a similar influencing effect for a crowd of people; i.e. the "push" effect in the unpleasantness in the first region 112a may be subsidised by the opposing "pull" effect in the second region. A skilled person would understand that the controller 30 may operate to achieve a similar degree of change in both the first region 112a and second region 112b, or alternatively the controller 30 may emphasise on only increasing the pleasantness in second region 112b to attach the crowd and deferring the introduction of any unpleasantness in the first region 112a, or vice versa.

The evaluation process may restart once the ambience control is implemented 240. In some cases a timer may be set so that the evaluation process may only restart at the expiration of the timer. This gives time for the crowd to react to the ambience change.

In some embodiments, feedback control 242 is implemented for providing reactive control, i.e. the degree of the latest change in environmental effect is also used as an input to evaluation process 230, to evaluate if a more prominent change in environmental effect is required. For example, if the crowd failed to promptly react to a change in the environment, i.e. the distribution of crowd does not change or only changes by a small amount, the controller 30 may opt to increase the degree of change in environmental effect to a higher level, even though the difference in occupancy information has not yet rise above the triggering threshold of said higher level. This contributes to a more reactive crowd management system.

Figure 6:
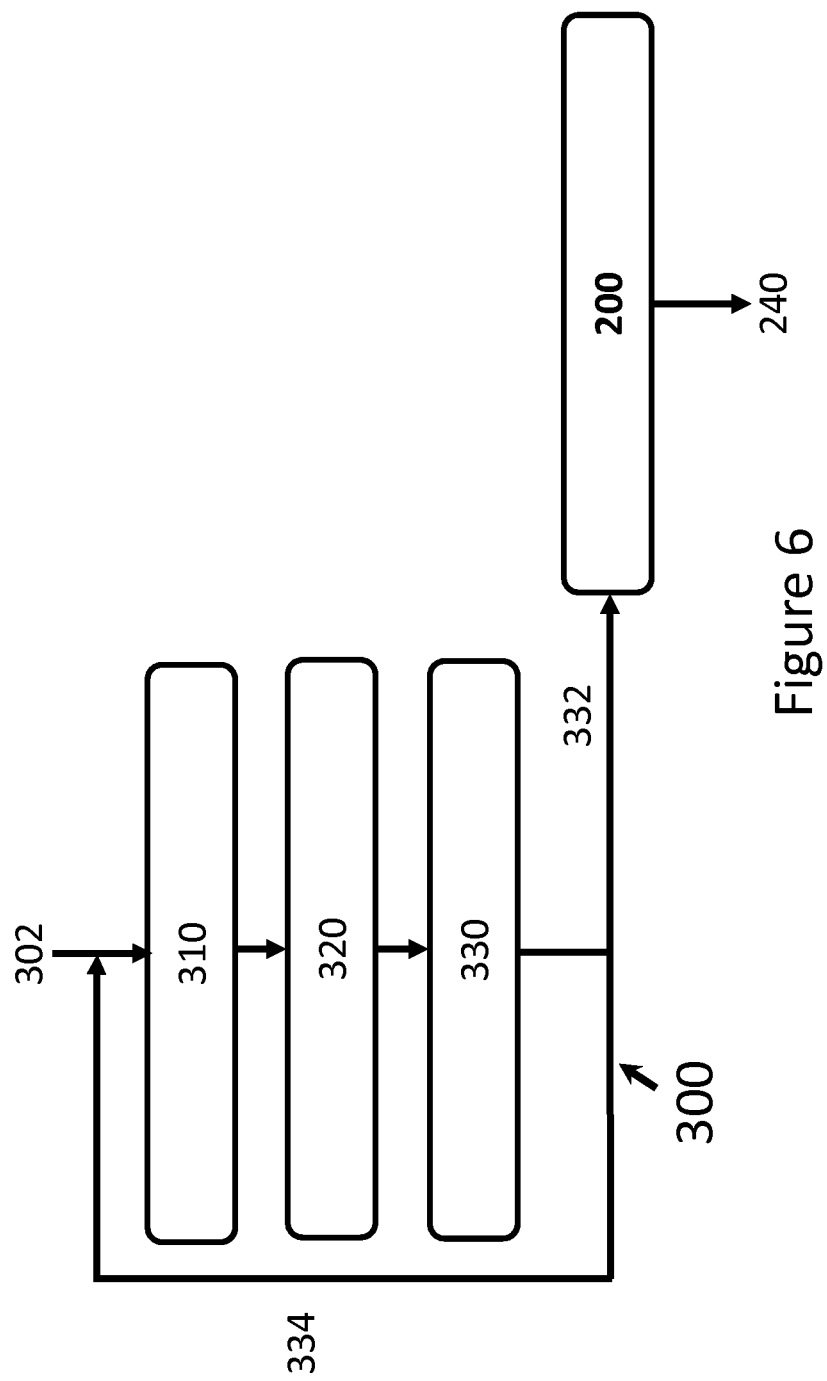
FIG. 6 is a flow chart showing the operation of controller in conjunction with a traffic monitor according to another embodiment of the present invention.

FIG. 6 shows an additional step 300 in the evaluating process. As pointed out earlier, the crowd management system 10 may not be required all the time throughout the duration of the event; it is only required when queues are formed during the peak moments (before and after the event, as well as during intermission). Therefore in some cases, the process 200 illustrated in FIG. 5 is only required upon detecting an approaching traffic. In the particular example shown in FIG. 6, upon detecting a crowd of approaching traffic 310 by relevant presence sensors (optical camera 20x and IR sensor 20y), the evaluation process checks and measures the throughput and direction of the traffic 320, before comparing said measurements with pre-set triggering threshold 330. For example, the evaluation process may only proceed 332 to progress to step 200 if a sizable traffic is heading towards the region 112a, 112b. Or else the process will start again 334 if the traffic is found to be insignificant to warrant any change in environmental effect. Alternatively, the triggering threshold may be set to a minimum level so that evaluation process will progress to step 200 regardless the size of traffic. In some embodiments, the degree of change in environmental effect varies with the size of incoming traffic; for example, upon detecting a large crowd of incoming traffic, the central control system implements a more prominent change in environmental effect in region 112a, 112b, so to guide and distribute the crowd evenly into region 112a and 112b.

Figure 7:
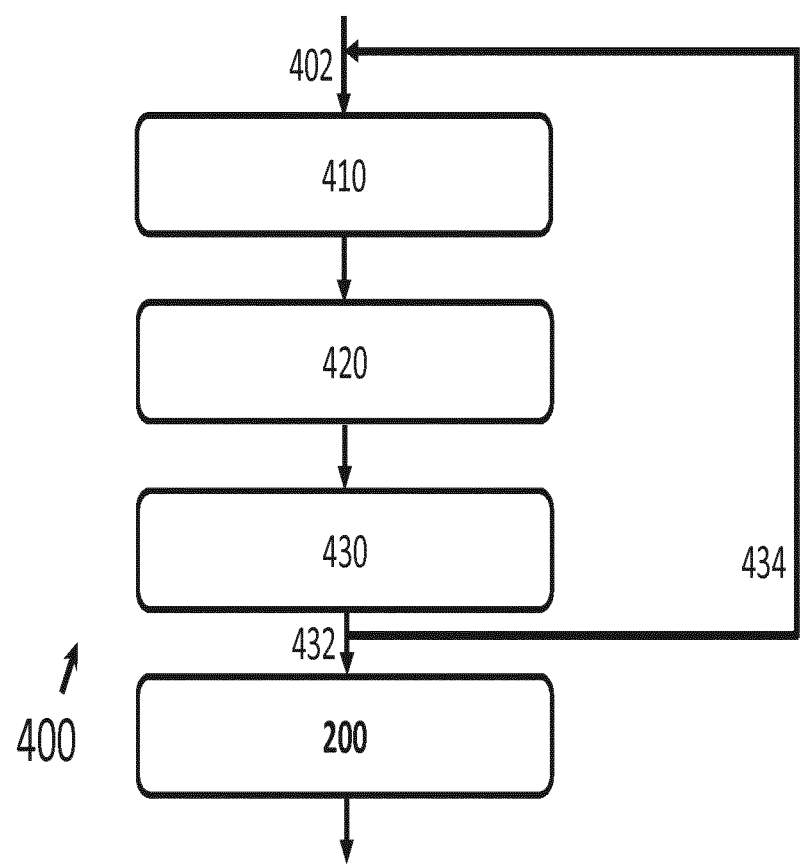
FIG. 7 is a flow chart showing the operation of controller capable of pre-emptive control with the use of historical data according to yet another embodiment of the present invention.

As shown in FIG. 7, the evaluation process 400 may partially or entirely depends upon historical data. For example the processing may started 402 with a triggering event 410, wherein the triggering event may be a timer corresponding to a schedule, i.e. 45 minutes in the case of a football match, or a manual trigger. Since the occupancy information form the presence sensors at the start of intermission does not produce any meaningful results, i.e. there is no initial crowd built-up, the evaluation process will instead consult historical data to predict the distribution of crowd amongst the different regions 420. As a result, a change in environment perception is already put in place 430 to influence and steer the crowd into the desirable region, so to achieve pre-emptive/preventive crowd control management. Once a queue is formed the evaluation process may switch back to analysing real time data 432, i.e. the process in step 200, or it can continue to carry out crowd distribution using historical data 434.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A crowd management system for influencing a crowd of people to distribute itself between a first region and a second region, comprising:
   at least one presence sensor configured to sense occupancy information from the first region and the second region; and
   a controller configured to receive said occupancy information from the at least one presence sensor; and
   at least one environmental control element configured to control an environmental effect in both the first region and the second region;
   wherein said controller is configured to compare the occupancy information relating to the first region and the second region and based thereon to control the environmental effect in both the first region and the second region via the at least one environmental control element, such that the environmental effect in one of the first region or the second region is relatively more attractive or repellent than the other, in order to thereby influence at least a portion of the crowd to distribute or redistribute itself between the first region and the second region.

2. The crowd management system as claimed in claim 1, wherein the occupancy information sensed by the at least one presence sensor for each respective one of the first and second regions, and based upon which the controller performs said control, comprises any one or more of: an absolute number of people in the respective region, a measure of a number of people in the respective region relative to a capacity of the respective region, a number of people in one or more queues in the respective region.

3. The crowd management system as claimed in claim 1, wherein the occupancy information sensed by the at least one presence sensor for each respective one of the first and second regions, and based upon which the controller performs said control, comprises any one or more of: a rate of flow of people passing into or out of the respective region, a rate of flow of people passing a predefined point or boundary in the respective region, a number of people turning in one or more predefined directions, a rate of flow of people in one or more predefined directions, and/or the number of people having a facial orientation or gazes in one or more predefined directions.

4. The crowd management system as claimed in claim 1, wherein the at least one presence sensor is adapted to detect rate of flow of people moving towards or away from the first region or second region; and wherein the controller is configured to perform said control of the environmental effect in the first region and second region based on rate of flow towards or away from the first or second region, in addition to the occupancy information of the first region and second region.

5. The crowd management system as claimed in claim 1, wherein the occupancy information comprises real time measurements from the at least one presence sensor; and wherein, via the at least one environmental control element, the controller is configured to control the environmental effect in the first region and second region based on said real time measurements.

6. The crowd management system as claimed in claim 1, wherein the controller is configured to determine a target change in the occupancy information, to determine a degree of said control of the environmental effect in the first and second regions based on the target change, to use the least one presence sensor to monitor a resulting change in the occupancy information in response to said control, and if the resulting change does not meet the target change after a predetermined time, to adapt the control of the environmental effect in one or both of the first and second regions in order to bring the resulting change closer to the target change.

7. The crowd management system as claimed in claim 1, wherein the occupancy information comprises historical data captured by the at least one presence sensor; and wherein the environmental control elements pre-emptively controls the environmental effect at the first region and second region based on said historical data.

8. The crowd management system as claimed in claim 1, wherein under the influence of controlled environmental effect, at least part of the crowd is both subconsciously repelled from one of the first region or the second region and attracted to the other of the first region or the second region.

9. The crowd management system as claimed in claim 1, wherein the at least one presence sensor comprises: one or more of optical cameras, one or more load cells, one or more microphones, one or more thermal sensors, one or more ultrasound sensors, and/or one or more infrared sensors.

10. The crowd management system as claimed in claim 1, wherein the at least one environmental control element comprises lighting system for emitting illumination into the first and second regions; and wherein said lighting system is configured to enable the controller to perform said control of the environmental effect in the first region and the second region by varying a light characteristic of the emitted illumination, the varied light characteristic comprising any one of a position, orientation, intensity, colour temperature and/or illumination pattern of the illumination; and wherein said control of the environmental effect in the first and/or second region comprises:
  a) emitting illumination with an unpleasant light characteristic to repel the at least part of the crowd from the first region or the second region, and/or
  b) emitting illumination with a pleasant light characteristic to attract at least part the crowd to the first region or the second region.

11. The crowd management system as claimed in claim 1, wherein said lighting system is configured to enable the controller to perform said control of the environmental effect in the first region and the second region by highlighting one or more key elements within the first region and second region; and wherein said key elements comprise one or more walls, floor regions and/or signs.

12. The crowd management system as claimed in claim 1, wherein the at least one environmental control element comprises a sound system for outputting either unpleasant sound effects or pleasant sound effects; and wherein the sound system is adapted to enable the controller to perform said control of the environmental effect in the first and/or second region by:
  a) emitting unpleasant sound effects to repel at least part of the crowd from the first region or second region, and/or
  b) emitting pleasant sound effects to attract at least part of the crowd to the first region or second region.

13. The crowd management system as claimed in claim 1, wherein the controller is configured to perform said control by initiating the change in the environmental effect in the first region and second region when a difference between their respective occupancy information increases above a threshold.

14. The crowd management system as claimed in claim 1, wherein the controller is configured to adjust a degree of difference between the environmental effect in the first region and second region in relation to a difference in their respective occupancy information.

15. A method of influencing a crowd of people to distribute themselves between a first region and a second region, comprising the step of:
  sensing occupancy information from the first region and the second region; and
  comparing said occupancy information relating to the first region and the second region; and based thereon
  controlling the environmental effect in both the first region and the second region via the at least one environmental control element, such that the environmental effect in one of the first region or the second region is relatively more attractive or repulsive than the other, in order to thereby influence at least a portion of the crowd to distribute or redistribute themselves between the first region and the second region.

* * * * *